(12) United States Patent
Schreiber et al.

(10) Patent No.: US 9,537,127 B2
(45) Date of Patent: Jan. 3, 2017

(54) LOW PROFILE BATTERY ASSEMBLY FOR ELECTRIFIED VEHICLES

(71) Applicant: FORD GLOBAL TECHNOLOGIES, LLC, Dearborn, MI (US)

(72) Inventors: Stuart Schreiber, Inkster, MI (US); Patrick Daniel Maguire, Ann Arbor, MI (US); Rajaram Subramanian, Ann Arbor, MI (US); Edward Popyk, Dearborn, MI (US); Keith Kearney, Grosse Ile, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 14/538,956

(22) Filed: Nov. 12, 2014

(65) Prior Publication Data
US 2016/0133897 A1    May 12, 2016

(51) Int. Cl.
| | |
|---|---|
| *H01M 10/613* | (2014.01) |
| *H01M 2/10* | (2006.01) |
| *H01M 10/625* | (2014.01) |
| *H01M 10/6554* | (2014.01) |

(52) U.S. Cl.
CPC ....... *H01M 2/1077* (2013.01); *H01M 10/5016* (2013.01); *H01M 10/5053* (2013.01); *H01M 10/613* (2015.04); *H01M 10/625* (2015.04); *H01M 10/6554* (2015.04); *H01M 2220/20* (2013.01)

(58) Field of Classification Search
None
See application file for complete search history.

(56) References Cited

U.S. PATENT DOCUMENTS

| | | | |
|---|---|---|---|
| 8,153,290 B2 | 4/2012 | Hermann et al. | |
| 2009/0208829 A1 | 8/2009 | Howard et al. | |
| 2011/0123855 A1 | 5/2011 | Kim et al. | |
| 2012/0094165 A1* | 4/2012 | Valencia, Jr. ..... | H01M 10/0525 429/120 |
| 2013/0004822 A1* | 1/2013 | Hashimoto ......... | H01M 2/1072 429/120 |
| 2013/0115506 A1 | 5/2013 | Wayne et al. | |
| 2013/0146249 A1* | 6/2013 | Katayama ................ | F28F 9/00 165/46 |
| 2013/0164592 A1 | 6/2013 | Maguire et al. | |
| 2013/0209857 A1* | 8/2013 | Lev ..................... | H01M 2/1077 429/120 |
| 2013/0288098 A1 | 10/2013 | Hamlett | |
| 2014/0141300 A1 | 5/2014 | Ronning et al. | |
| 2014/0220391 A1* | 8/2014 | Fujii ................. | H01M 10/4257 429/7 |

* cited by examiner

*Primary Examiner* — Patrick Ryan
*Assistant Examiner* — Kiran Akhtar
(74) *Attorney, Agent, or Firm* — Carlson, Gaskey & Olds (57) ABSTRACT

A battery assembly according to an exemplary aspect of the present disclosure includes, among other things, a plurality of battery cells and a support structure positioned about the plurality of battery cells. The support structure includes at least one sidewall and the at least one sidewall includes a first flange that extends adjacent a top surface of each of the plurality of battery cells and a second flange that extends beyond a bottom surface of each of the plurality of battery cells.

12 Claims, 6 Drawing Sheets

LOW PROFILE BATTERY ASSEMBLY FOR ELECTRIFIED VEHICLES

TECHNICAL FIELD

This disclosure relates to a battery assembly for an electrified vehicle. The battery assembly includes a battery array with at least one sidewall attached to either a tray or a cold plate along a span length of the assembly to maintain contact between the battery array and the cold plate for improved thermal performance.

BACKGROUND

The need to reduce automotive fuel consumption and emissions is well known. Therefore, vehicles are being developed that either reduce or completely eliminate reliance on internal combustion engines. Electrified vehicles are one type of vehicle being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

High voltage batteries for powering electric machines of an electrified vehicle typically include multiple battery arrays. Each battery array includes a plurality of battery cells and a support structure (i.e., endwalls and sidewalls) that generally surrounds the battery cells to build the battery array. A cold plate may be positioned along a bottom of the battery cells to thermally manage the heat generated by the battery cells.

SUMMARY

A battery assembly according to an exemplary aspect of the present disclosure includes, among other things, a plurality of battery cells and a support structure positioned about the plurality of battery cells. The support structure includes at least one sidewall. The at least one sidewall includes a first flange that extends adjacent a top surface of each of the plurality of battery cells and a second flange that extends beyond a bottom surface of each of the plurality of battery cells.

In a further non-limiting embodiment of the foregoing assembly, the plurality of battery cells are positioned atop a cold plate.

In a further non-limiting embodiment of either of the foregoing assemblies, the second flange extends to a position adjacent to a side of the cold plate and is attached to the side.

In a further non-limiting embodiment of any of the foregoing assemblies, a thermal interface material is compressed between the cold plate and the plurality of battery cells.

In a further non-limiting embodiment of any of the foregoing assemblies, the at least one sidewall includes a first height that is greater than a second height of the plurality of battery cells.

In a further non-limiting embodiment of any of the foregoing assemblies, the support structure includes opposing endwalls and opposing sidewalls.

In a further non-limiting embodiment of any of the foregoing assemblies, the first flange wraps around a portion of the top surface of each of the plurality of battery cells.

In a further non-limiting embodiment of any of the foregoing assemblies, the first flange extends in a plane that is transverse to the second flange.

In a further non-limiting embodiment of any of the foregoing assemblies, the first flange extends in a first plane and the second flange extends in a second plane that is parallel to the first plane.

In a further non-limiting embodiment of any of the foregoing assemblies, the second flange includes at least one opening.

In a further non-limiting embodiment of any of the foregoing assemblies, a fastener is received within the at least one opening to secure the at least one sidewall to a cold plate.

In a further non-limiting embodiment of any of the foregoing assemblies, the assembly comprises a tray, and the at least one sidewall is attached to the tray.

In a further non-limiting embodiment of any of the foregoing assemblies, the at least one sidewall includes a body extending between the first flange and the second flange. The second flange includes a flared portion that flares outwardly from the body.

In a further non-limiting embodiment of any of the foregoing assemblies, the plurality of battery cells are positioned atop a cold plate.

In a further non-limiting embodiment of any of the foregoing assemblies, the at least one sidewall is attached to one of a tray and a cold plate with a weld bead.

A battery assembly according to another exemplary aspect of the present disclosure includes, among other things, a tray, a cold plate positioned on the tray and a battery array including a plurality of battery cells positioned on the cold plate. The battery array includes a sidewall attached to one of the tray and the cold plate and extending beyond a bottom surface of each of the plurality of battery cells.

In a further non-limiting embodiment of the foregoing assembly, the sidewall includes a first flange that wraps around a portion of a top surface of each of the plurality of battery cells.

In a further non-limiting embodiment of either of the foregoing assemblies, the sidewall includes a second flange that extends to a position adjacent to a side of the cold plate.

In a further non-limiting embodiment of any of the foregoing assemblies, the sidewall is secured to one of the tray and the cold plate with at least one fastener.

In a further non-limiting embodiment of any of the foregoing assemblies, the sidewall is secured to one of the tray and the cold plate with at least one weld bead.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details a battery assembly for an electrified vehicle. The battery assembly may include a plurality of battery cells and a support structure positioned about the battery cells to build a battery array. The support structure includes one or more sidewalls having an extension that extends beyond a bottom surface of each of the plurality of battery cells. The extension may be attached to either a cold plate or a tray of the battery assembly using any of a variety of fastening techniques. The exemplary battery assemblies of this disclosure provide low profile array to cold plate/tray attachments along a span length of the array to achieve proper thermal performance. These and other features are discussed in greater detail in the paragraphs that follow.

Figure 1:
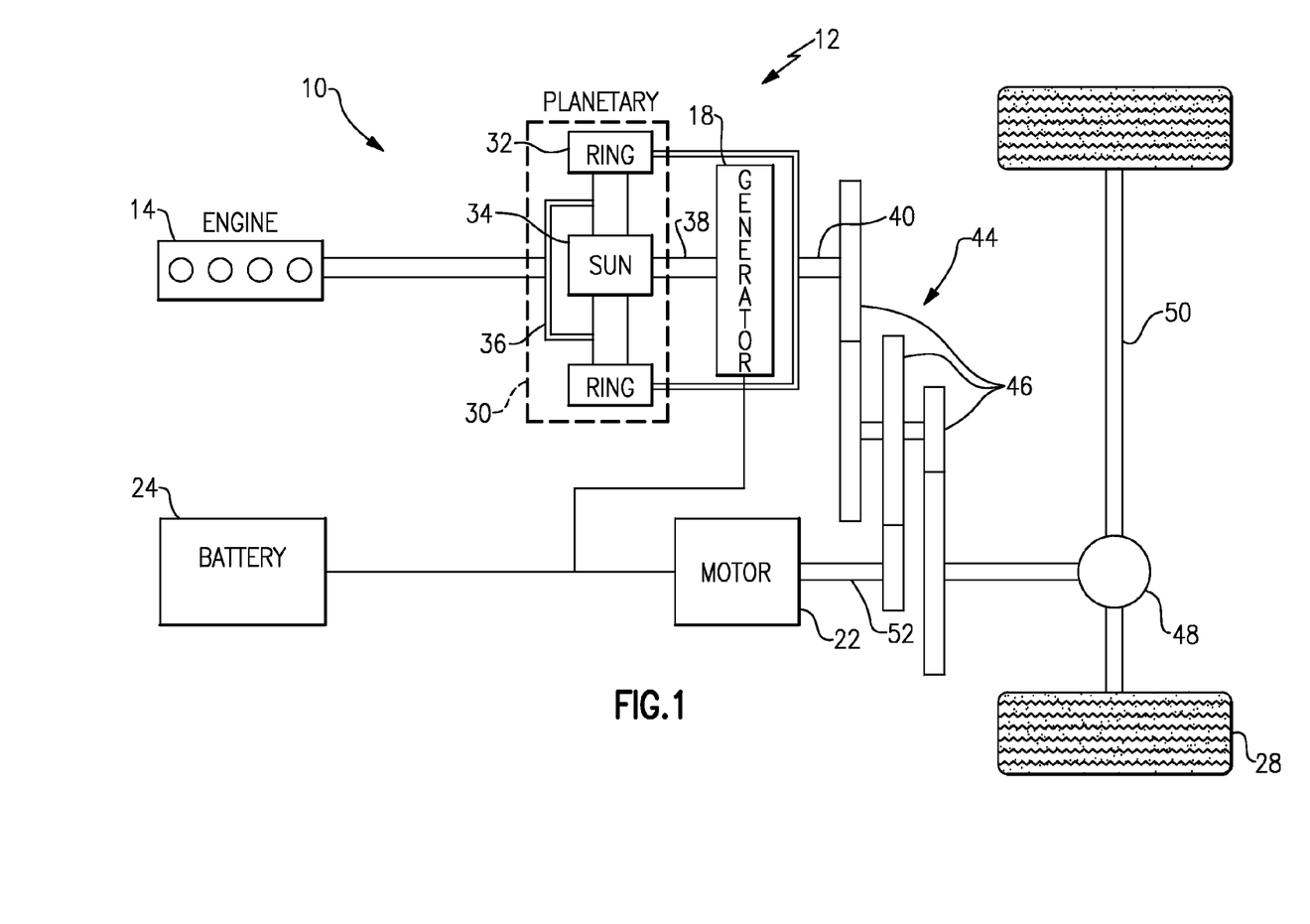
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's) and fuel cell vehicles.

In one embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is an example type of electrified vehicle battery. The battery 24 may include a high voltage traction battery pack that includes a plurality of battery arrays capable of outputting electrical power to operate the motor 22 and the generator 18. Other types of energy storage devices and/or output devices can also be used to electrically power the electrified vehicle 12.

In one non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery 24 state of charge up to its maximum allowable discharging rate under certain driving patterns/cycles. The EV mode is an example of a charge depleting mode of operation for the electrified vehicle 12. During EV mode, the state of charge of the battery 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery 24 at a constant or approximately constant level by increasing the engine 14 propulsion usage. The electrified vehicle 12 may be operated in other operating modes in addition to the EV and HEV modes within the scope of this disclosure.

Figure 2:
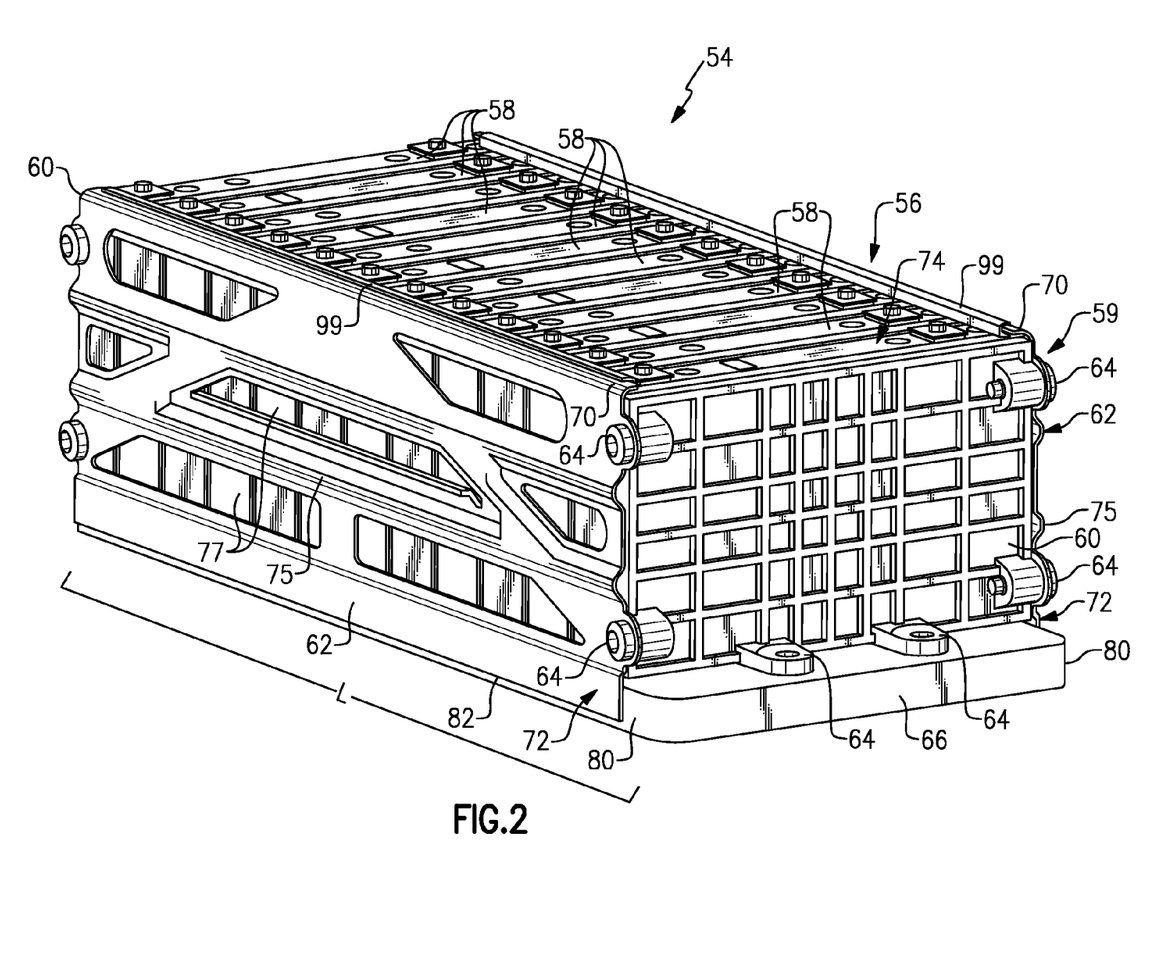
FIG. 2 illustrates a battery assembly of an electrified vehicle according to a first embodiment of this disclosure.

FIG. 2 illustrates a battery assembly 54 that can be incorporated into an electrified vehicle. For example, the battery assembly 54 could be employed as part of the battery 24 of the electrified vehicle 12 of FIG. 1. The battery assembly 54 includes one or more battery arrays 56 for supplying electrical power to the components of an electrified vehicle. Although a single battery array 56 is illustrated in FIG. 2, the battery assembly 54 could include multiple battery arrays 56 within the scope of this disclosure. In other words, this disclosure is not limited to the specific configuration shown in FIG. 2.

The battery array 56 includes a plurality of battery cells 58 and a support structure 59 positioned about the plurality of battery cells 58. The battery cells 58 may be stacked side-by-side along a span length L of the battery array 56, and may extend between opposing endwalls 60 and sidewalls 62 of the support structure 59. In one embodiment, the support structure 59 generally surrounds the battery array 56 on at least four sides. The sidewalls 62 of the support structure 59 may be connected to the endwalls 60 using one or more fasteners 64 to build the battery array 56.

In one embodiment, the battery cells 58 are prismatic, lithium-ion cells. However, other battery cells, including but not limited to cylindrical or pouch cells, could alternatively be utilized within the scope of this disclosure.

The battery assembly 54 may additionally include a cold plate 66. The battery array 56 may be positioned atop a cold plate 66. The cold plate 66 functions to remove heat generated by the battery cells 58 during certain conditions. In one embodiment, the cold plate 66 is a structural cast cold plate. In another embodiment, the cold plate 66 is a stamped cold plate. It should be understood that the cold plate 66 may be manufactured using any technique and using any material sufficient to compensate for the bending moment that may develop between the sidewalls 62 of the battery array 56 along the span length L. In another embodiment, the endwalls 60 are secured to the cold plate 66 using additional fasteners 64.

Figure 3:
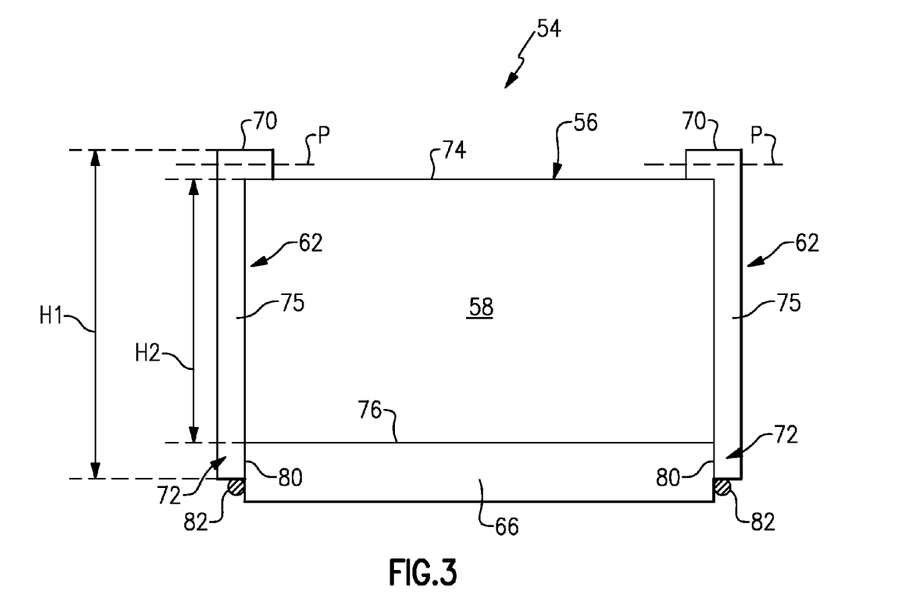
FIG. 3 illustrates an end view of a battery assembly.

Referring now to FIGS. 2 and 3, one or both of the sidewalls 62 of the battery array 56 may include a first flange 70, a second flange 72 and a body 75 that extends between the first flange 70 and the second flange 72. The first flange 70 is adjacent a top surface 74 of the battery cells 58 and the second flange 72 is adjacent a bottom surface 76 of the battery cells 58. The body 75 of the sidewalls 62 may optionally include a plurality of openings 77 (see FIG. 2) for reducing the weight of the battery array 56.

In one embodiment, the sidewalls 62 of the support structure 59 include a first height H1 that is a greater height than a height H2 of the battery cells 58 (best illustrated in FIG. 3). The first flange 70 may wrap around a portion of the top surfaces 74 of the battery cells 58 such that it extends toward the opposite sidewall 62. The first flange 70 applies a compressive force against the battery cells 58 to maintain consistent contact between the battery cells 58 and the cold plate 66. A seal 99 may be positioned between the first flange 70 and the top surfaces 74 of the battery cells 58 (see FIG. 2). In another embodiment, the first flange 70 extends in a plane P that is transverse to both the body 75 and the second flange 72 of the sidewalls 62 (see FIG. 3).

The second flange 72 extends beyond, or in this example below, the bottom surface 76 of each of the battery cells 58. The second flange 72 therefore extends to position adjacent to a side 80 of the cold plate 66. In one non-limiting embodiment, the second flange 72 of one or both of the sidewalls 62 may be attached to the cold plate 66 along the span length L. This can be accomplished using any of a variety of fastening techniques. In one embodiment, the second flange 72 is welded to the cold plate 66 using one or more weld beads 82. Either a continuous weld bead 82 that extends along all or a portion of the span length L or a plurality of discrete weld beads 82 spaced along the span length L may be employed to mount the sidewall 62 to the cold plate 66. Suitable welding techniques include, but are not limited to, laser welding, gas metal arc welding, spot welding, projection welding, etc. In another embodiment, one or more fasteners can be used to attach the sidewall 62 to the cold plate 66 (see, for example, FIG. 6, discussed in greater detail below).

Figure 4:
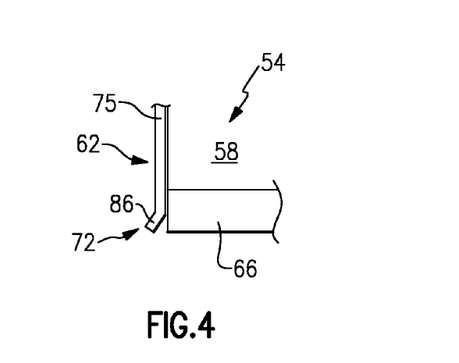
FIG. 4 illustrates features associated with a sidewall of a battery array.

FIG. 4 illustrates additional features of a sidewall 62 of the battery assembly 54. In one embodiment, the second flange 72 of the sidewall 62 includes a flared portion 86 that is flared outwardly (i.e., in a direction away from the battery cells 58) relative to the body 75 of the sidewall 62. The flared portion 86 reduces assembly complexities of the battery assembly 54 by simplifying placement of the battery array 56 over the cold plate 66. The flared portion 86 includes enough flexibility to allow the second flange 72 to be pushed or bent to a position that is flush with the cold plate 66.

Figure 5:
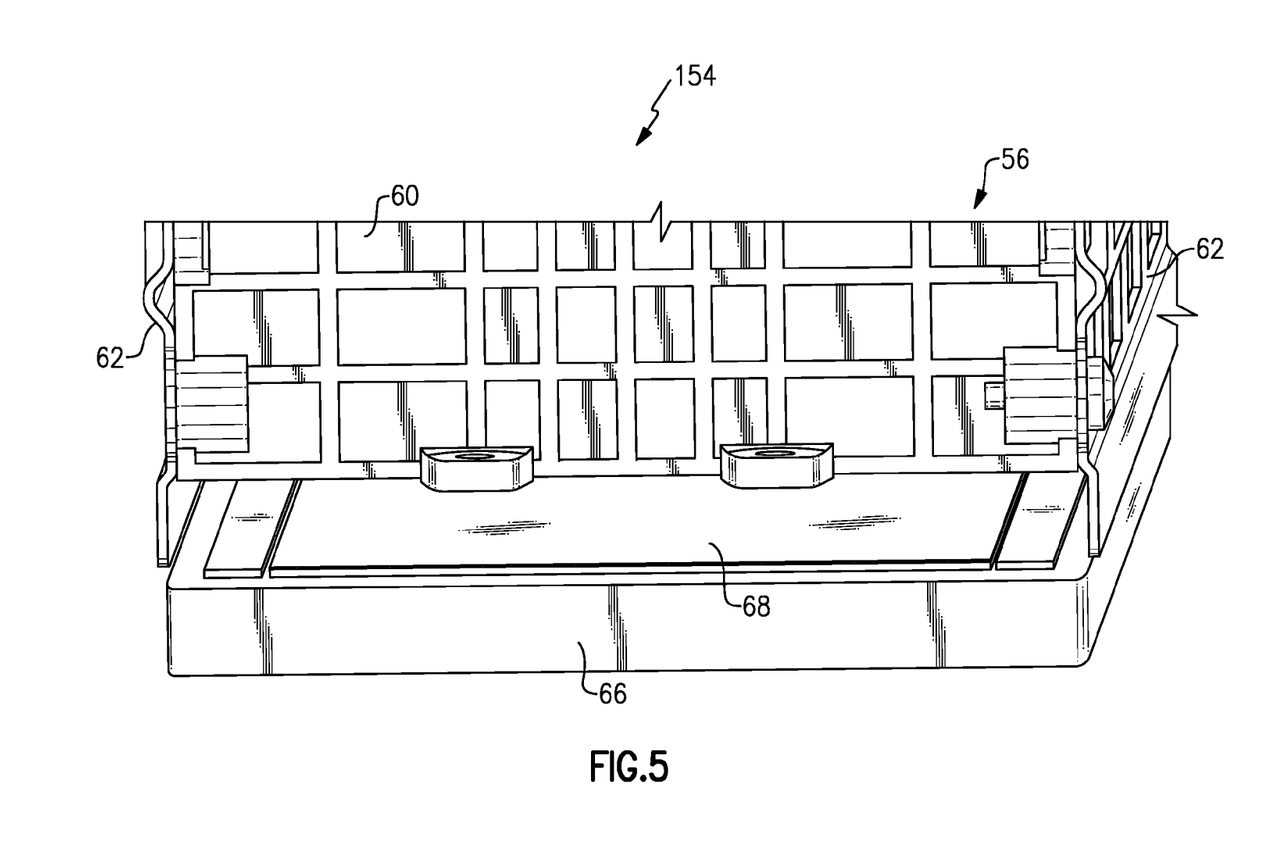
FIG. 5 illustrates a battery assembly according to a second embodiment of this disclosure.

FIG. 5 illustrates portions of another exemplary battery assembly 154. In this disclosure, like reference numbers designate like elements where appropriate and reference numerals with the addition of 100 or multiples thereof designate modified elements that are understood to incorporate the same features and benefits of the corresponding original elements.

In this embodiment, a thermal interface material (TIM) 68 may be positioned between the cold plate 66 and the battery array 56 of the battery assembly 154. In one embodiment, the TIM 68 is compressed between the cold plate 66 and the battery array 56. The TIM 68 may be made from a material having a relatively high thermal conductivity and is configured to maintain thermal contact between the battery cells 58 and the cold plate 66 in order to increase the thermal conductivity between these neighboring components during a heat transfer event. For example, the TIM 68 may distribute heat over the complete contact surface between the battery cells (not shown) of the battery array 56 and the cold plate 66. The TIM 68 may extend across an entirety of, or across discrete portions of, the cold plate 66.

Figure 6:
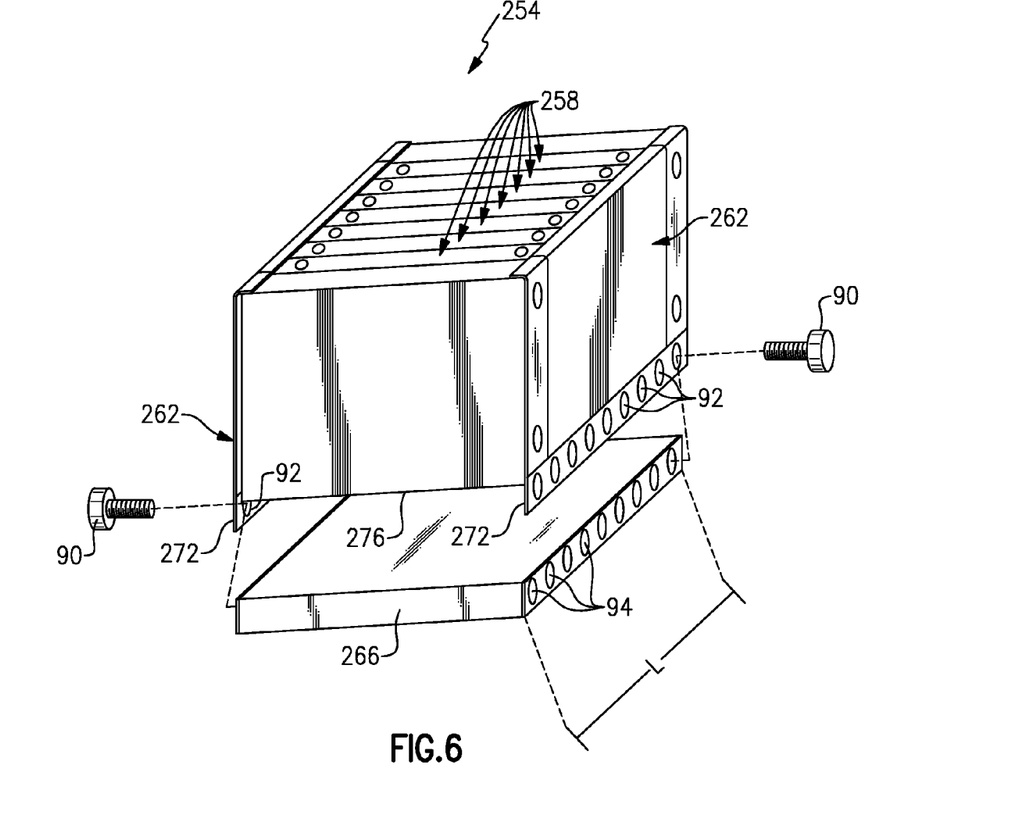
FIG. 6 illustrates a battery assembly according to a third embodiment of this disclosure.

FIG. 6 illustrates another exemplary battery assembly 254. In this embodiment, sidewalls 262 of a battery array 256 are connected to a cold plate 266 by one or more fasteners 90. The fasteners 90 may be threaded fasteners or any other type of mechanical fasteners. A second flange 272 of the sidewalls 262, or the portion of the sidewalls 262 that extends beyond a bottom surface 276 of the battery cells 258, may include one or more openings 92. The openings 92 align with corresponding openings 94 of the cold plate 266 during assembly of the battery assembly 254. The fasteners 90 may be received within the openings 92 and the openings 94 to attach the sidewalls 262 to the cold plate 266. In one embodiment, the openings 92 and the openings 94 are dispersed along an entire span length L of the battery assembly 254.

Figure 7:
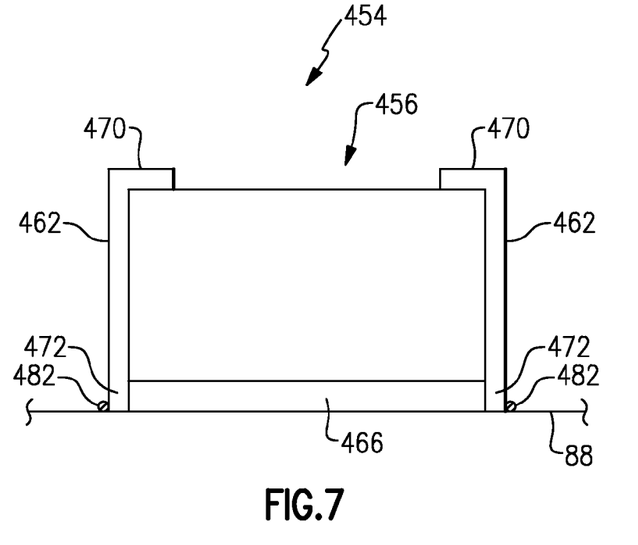
FIG. 7 illustrates a battery assembly according to another embodiment of this disclosure.

FIGS. 2-6 illustrate battery assemblies that include sidewall to cold plate attachments. However, the battery array could be mechanically affixed to other structures of a battery assembly. FIG. 7, for example, illustrates a battery assembly 454 that includes a battery array 456 that is attached to a tray 88. In one embodiment, sidewalls 462 of the battery array 456 are welded to the tray 88 via one or more weld beads 482. A cold plate 466 may be trapped between the tray 88 and the battery array 456. In this embodiment, the sidewalls 462 include a first flange 470 and a second flange 472 that are transverse to one another. The weld beads 482 may be applied between the second flanges 472 and the tray 88.

Figure 8:
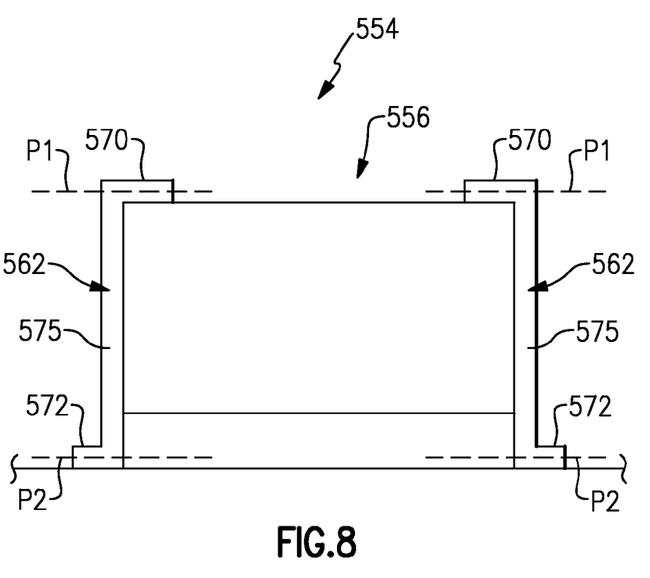
FIG. 8 illustrates a battery assembly according to yet another embodiment of this disclosure.

FIG. 8 illustrates a battery assembly 554 that is similar to the battery assembly 454 of FIG. 8. In this embodiment, sidewalls 562 of a battery array 556 include a first flange 570 and a second flange 572. The first flange 570 extends in a first plane P1 and the second flange 572 extends in a second plane P2 that is parallel to the first plane P1. The first flange 570 and the second flange 572 extend in opposite directions from a body 575 of the sidewalls 562. The sidewalls 562 are attached to the tray 88 along the second flanges 572, and can be either welded or mechanically fastened using fasteners.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery assembly, comprising:
    a plurality of battery cells positioned atop a cold plate;
        a support structure positioned about said plurality of battery cells, said support structure including at least one sidewall; and
        said at least one sidewall including a first flange that extends adjacent a top surface of each of said plurality of battery cells and a second flange that extends beyond a bottom surface of each of said plurality of battery cells, and said second flange extends to a position adjacent to a side of said cold plate and is directly attached to said side,
    wherein said second flange includes at least one first opening
    a second opening in said cold plate that aligns with said first opening; and
    a fastener received through said first opening and said second opening to secure said battery array to said cold plate.

2. The assembly as recited in claim 1, comprising a thermal interface material compressed between said cold plate and said plurality of battery cells.

3. The assembly as recited in claim 1, wherein said at least one sidewall includes a first height that is greater than a second height of said plurality of battery cells.

4. The assembly as recited in claim 1, wherein said support structure includes opposing endwalls and opposing sidewalls.

5. The assembly as recited in claim 1, wherein said first flange wraps around a portion of said top surface of each of said plurality of battery cells.

6. The assembly as recited in claim 1, wherein said first flange extends in a plane that is transverse to said second flange.

7. The assembly as recited in claim 1, wherein said first flange extends in a first plane and said second flange extends in a second plane that is parallel to said first plane.

8. The assembly as recited in claim 1, comprising a tray, and said at least one sidewall attached to said tray.

9. The assembly as recited in claim 1, wherein said at least one sidewall includes a body extending between said first flange and said second flange, wherein said second flange includes a flared portion that flares outwardly from said body.

10. The assembly as recited in claim 1, comprising a seal positioned between said first flange and said top surface.

11. The assembly as recited in claim 1, wherein said at least one sidewall includes a plurality of weight reducing openings.

12. A battery assembly, comprising:
    a cold plate;
    a battery array including a sidewall directly mounted to said cold plate;
    a first opening through said sidewall;
    a second opening in said cold plate that aligns with said first opening; and
    a fastener received through said first opening and said second opening to secure said battery array to said cold plate.

* * * * *

UNITED STATES PATENT AND TRADEMARK OFFICE
CERTIFICATE OF CORRECTION

| | | |
|---|---|---|
| PATENT NO. | : 9,537,127 B2 | Page 1 of 1 |
| APPLICATION NO. | : 14/538956 | |
| DATED | : January 3, 2017 | |
| INVENTOR(S) | : Stuart Schreiber | |

It is certified that error appears in the above-identified patent and that said Letters Patent is hereby corrected as shown below:

In the Claims

In Claim 1, Column 7, Line 32; after "opening" insert --;--

In Claim 1, Column 7, Line 36; delete "said battery array" and replace with --said at least one sidewall--

Signed and Sealed this
Thirtieth Day of May, 2017

Michelle K. Lee
*Director of the United States Patent and Trademark Office*